United States Patent
Talasco et al.

(10) Patent No.: US 9,051,044 B2
(45) Date of Patent: Jun. 9, 2015

(54) COUNTER-ROTATING OPEN-ROTOR (CROR)

(75) Inventors: Eric J. Talasco, North Granby, CT (US); Paul A. Carvalho, Hadley, MA (US); David R. Danielson, Suffield, CT (US); Robert H. Perkinson, Somers, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 749 days.

(21) Appl. No.: 13/109,188

(22) Filed: May 17, 2011

(65) Prior Publication Data

US 2011/0286841 A1 Nov. 24, 2011

Related U.S. Application Data

(60) Provisional application No. 61/345,725, filed on May 18, 2010, provisional application No. 61/345,743, filed on May 18, 2010.

(51) Int. Cl.
*B64C 11/30* (2006.01)
*B64D 27/00* (2006.01)

(52) U.S. Cl.
CPC ......... *B64C 11/306* (2013.01); *B64D 2027/005* (2013.01); *Y02T 50/66* (2013.01)

(58) Field of Classification Search
CPC . B64C 11/306; B64D 2027/005; Y02T 50/66
USPC ........................... 416/1, 25, 26, 27
See application file for complete search history.

(56) References Cited

U.S. PATENT DOCUMENTS

| | | | |
|---|---|---|---|
| 2,923,361 A | 2/1960 | Best | |
| 4,171,183 A | 10/1979 | Cornell et al. | |
| 4,183,210 A | 1/1980 | Snell | |
| 4,358,246 A | 11/1982 | Hanson et al. | |
| 4,370,097 A | 1/1983 | Hanson et al. | |
| 4,728,261 A * | 3/1988 | Wright et al. | 416/127 |
| 4,730,985 A | 3/1988 | Rothman et al. | |
| 4,765,135 A | 8/1988 | Lardellier | |
| 4,772,180 A * | 9/1988 | Walker et al. | 416/33 |
| 4,772,181 A * | 9/1988 | Poucher | 416/33 |
| 4,842,484 A | 6/1989 | Johnson | |
| 4,881,367 A | 11/1989 | Flatman | |
| 4,913,623 A | 4/1990 | Schilling et al. | |
| 4,927,329 A | 5/1990 | Kliman et al. | |
| 5,022,821 A | 6/1991 | Isert | |

(Continued)

FOREIGN PATENT DOCUMENTS

| | | |
|---|---|---|
| CA | 2673642 | 11/2008 |
| GB | 2194357 | 3/1988 |

(Continued)

OTHER PUBLICATIONS

European Search Report for European Application No. 11166635.0 completed Nov. 10, 2014.

*Primary Examiner* — Edward Look
*Assistant Examiner* — Jesse Prager
(74) *Attorney, Agent, or Firm* — Carlson, Gaskey & Olds, P.C.

(57) ABSTRACT

A method of controlling a Counter-Rotating Open-Rotor (CROR) includes measuring a speed of a first rotor and deriving a speed of a second rotor and controlling a pitch of the first rotor and the second rotor.

21 Claims, 9 Drawing Sheets

(56) References Cited

U.S. PATENT DOCUMENTS

| | | | |
|---|---|---|---|
| 5,054,998 A * | 10/1991 | Davenport | 416/1 |
| 5,090,869 A | 2/1992 | Wright | |
| 5,122,034 A | 6/1992 | Isert | |
| 5,152,668 A | 10/1992 | Bulman et al. | |
| 5,154,580 A | 10/1992 | Hora | |
| 5,156,648 A | 10/1992 | Hora | |
| 5,213,471 A | 5/1993 | Miller et al. | |
| 5,242,265 A | 9/1993 | Hora et al. | |
| 5,299,911 A | 4/1994 | Moriya | |
| 5,464,324 A | 11/1995 | Langenberg | |
| 5,470,199 A | 11/1995 | Schafer et al. | |
| 5,498,135 A | 3/1996 | Stallard, III | |
| 6,109,871 A | 8/2000 | Nelson et al. | |
| 6,295,328 B1 | 9/2001 | Kim et al. | |
| 7,891,163 B2 | 2/2011 | Richards | |

FOREIGN PATENT DOCUMENTS

| | | |
|---|---|---|
| GB | 2209371 | 5/1989 |
| WO | 8403480 | 9/1984 |
| WO | 2008089432 | 7/2008 |

\* cited by examiner

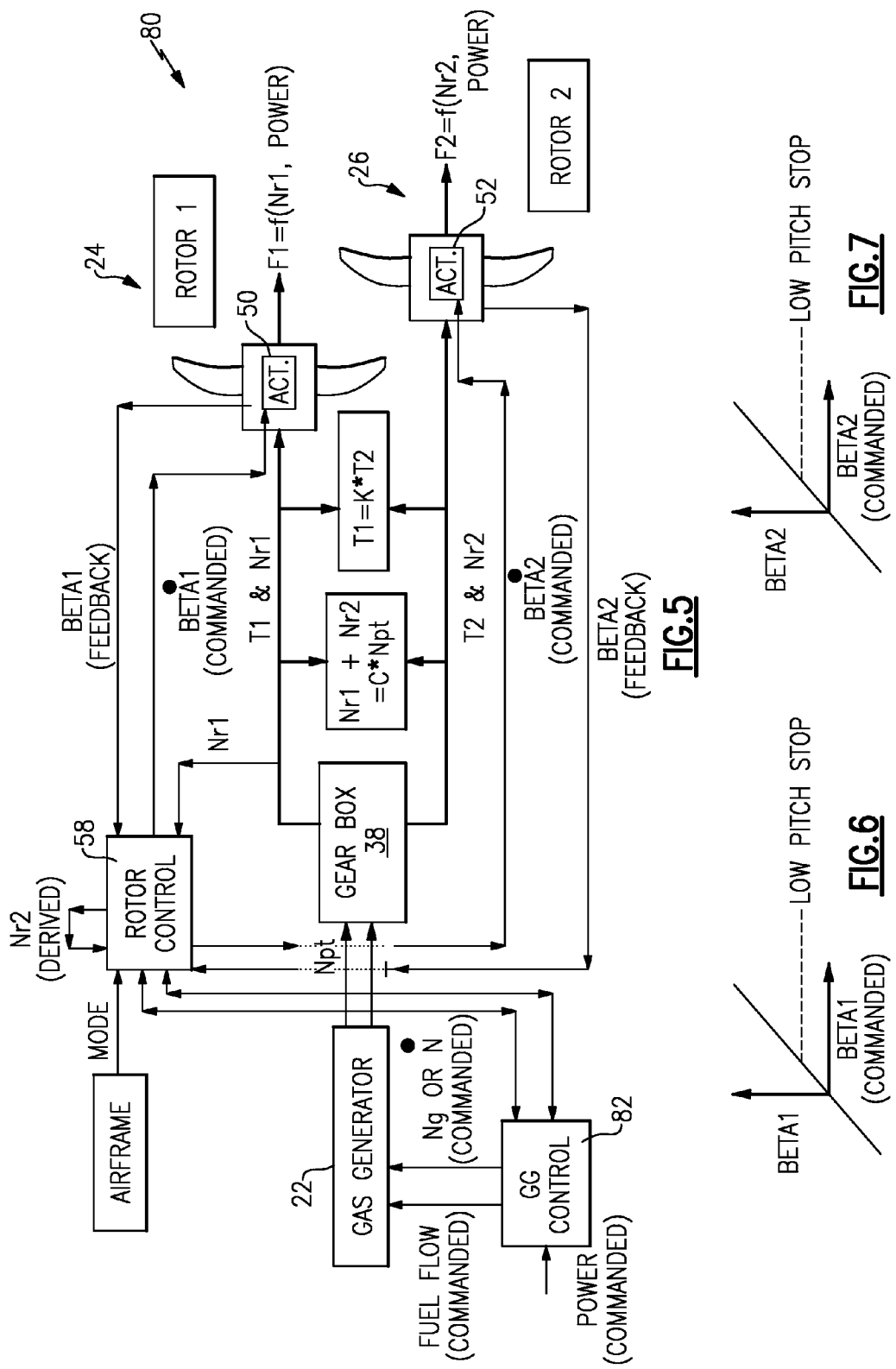

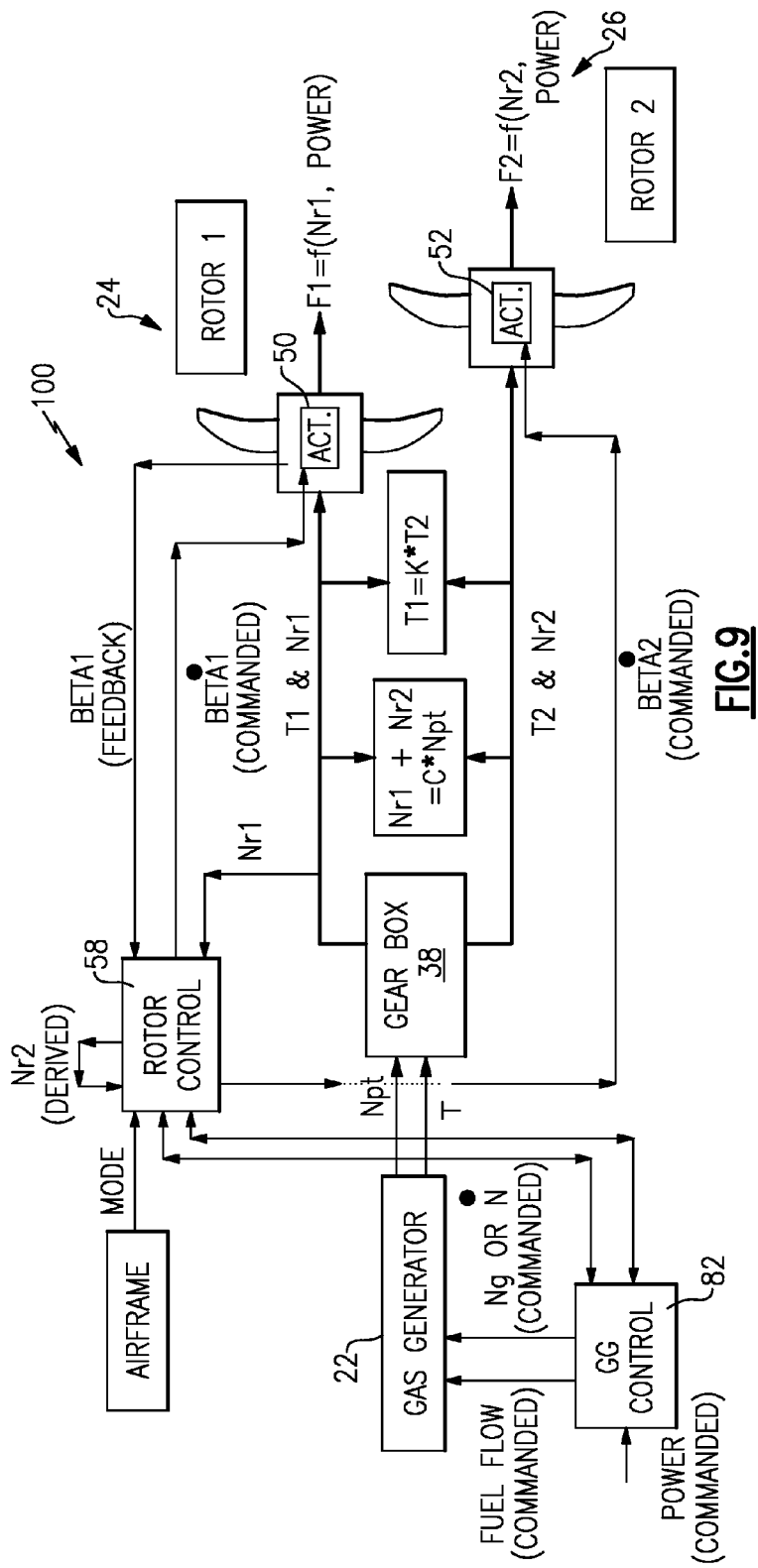
FIG.9
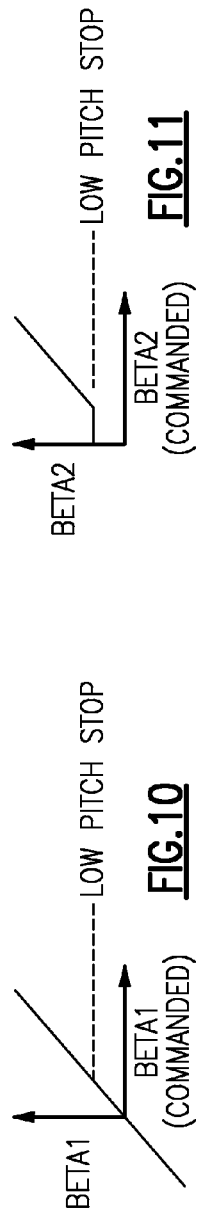
FIG.10
FIG.11

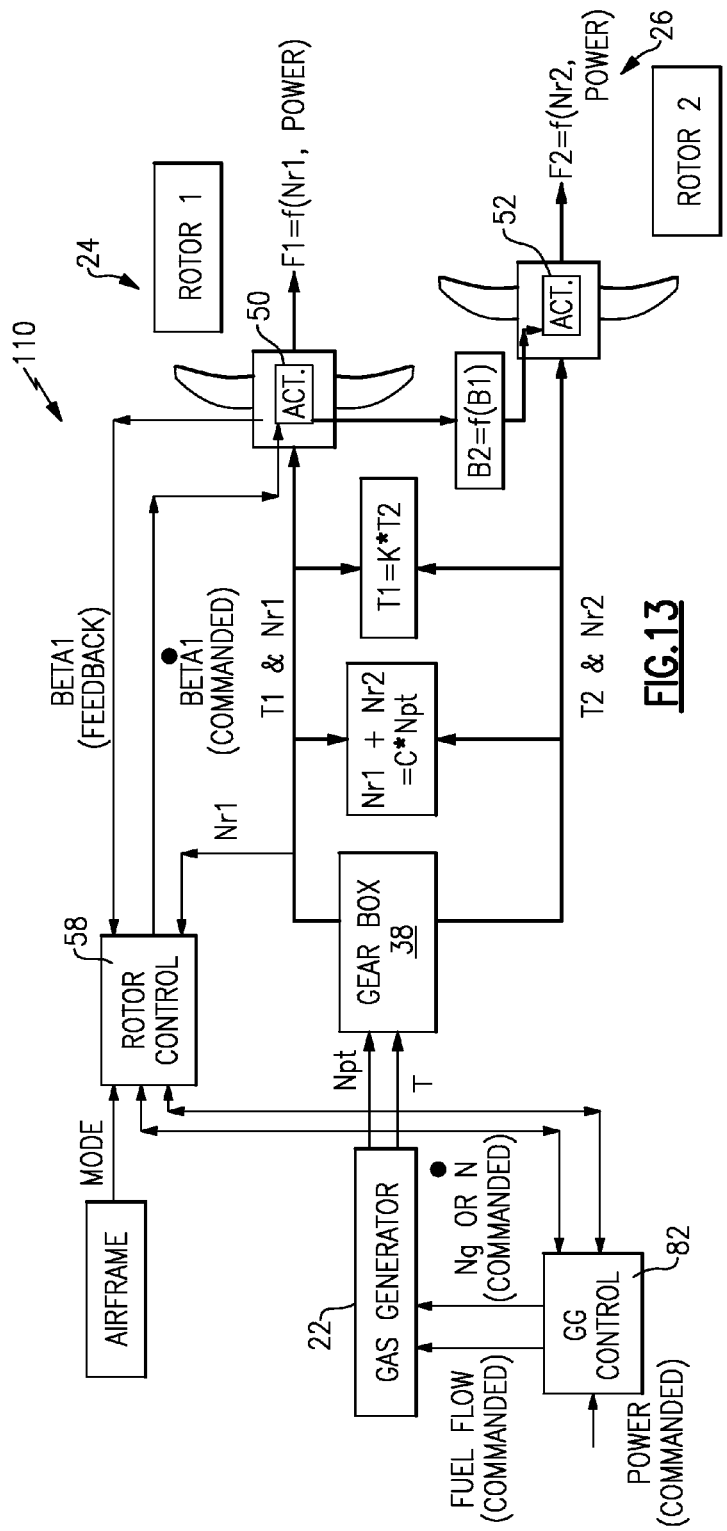
FIG.13
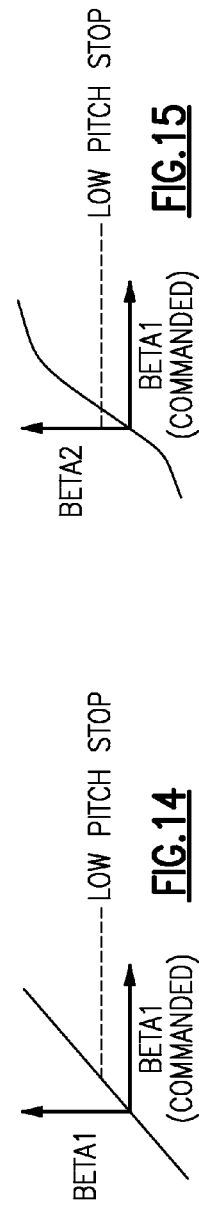
FIG.15
FIG.14

COUNTER-ROTATING OPEN-ROTOR (CROR)

The present disclosure claims priority to U.S. Provisional Patent Application No. 61/345,725, filed May 18, 2010 and U.S. Provisional Patent Application No. 61/345,743, filed May 18, 2010.

BACKGROUND

The present disclosure relates to gas turbine engines, and more particularly to Beta operation of a Counter-Rotating Open-Rotor (CROR).

A Counter-Rotating Open-Rotor (CROR) includes a gas turbine engine with counter-rotating un-ducted rotors outside a nacelle structure. Propfans are also known as ultra-high bypass (UHB) engines and, most recently, open rotor jet engines. The design is intended to offer the speed and performance of a turbofan, with the fuel economy of a turboprop.

CRORs may have particular challenges in terms of aerodynamics, aeroacoustics and structural dynamics as the forward and aft rotors are outside the nacelle structure and are positioned relatively close together which may result in rotor/rotor interactions.

SUMMARY

A method of controlling a Counter-Rotating Open-Rotor (CROR) according to an exemplary aspect of the present disclosure includes measuring a speed of a first rotor and deriving a speed of a second rotor and controlling a pitch of the first rotor and the second rotor.

A method of controlling a Counter-Rotating Open-Rotor (CROR) according to an exemplary aspect of the present disclosure includes entering Beta Control and preventing one rotor of a first rotor and a second rotor from entering a CP (coefficient of power) bucket.

A Counter-Rotating Open-Rotor (CROR) according to an exemplary aspect of the present disclosure includes a rotor control module operable to derive a speed of one of a first rotor and a second rotor and measure a speed of the other one of said first rotor and said second rotor.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 5 is a block diagram of one non-limiting embodiment of a control system to control the counter-rotating un-ducted rotors of the CROR propfan;

FIG. 6 is a schematic representation of a control map of a forward rotor of the CROR propfan of FIG. 5;

FIG. 7 is a schematic representation of a control map of an aft rotor of the CROR propfan of FIG. 5;

FIG. 9 is a block diagram of another non-limiting embodiment of a control system to control the counter-rotating un-ducted rotors of the CROR propfan;

FIG. 10 is a schematic representation of a control map of a forward rotor of the CROR propfan of FIG. 9;

FIG. 11 is a schematic representation of a control map of an aft rotor of the CROR propfan of FIG. 9;

FIG. 13 is a block diagram of another non-limiting embodiment of a control system to control the counter-rotating un-ducted rotors of the CROR propfan;

FIG. 14 is a schematic representation of a control map of a forward rotor of the CROR propfan of FIG. 13; and FIG. 15 is a schematic representation of a control map of an aft rotor of the CROR propfan of FIG. 13.

DETAILED DESCRIPTION

Figure 1:
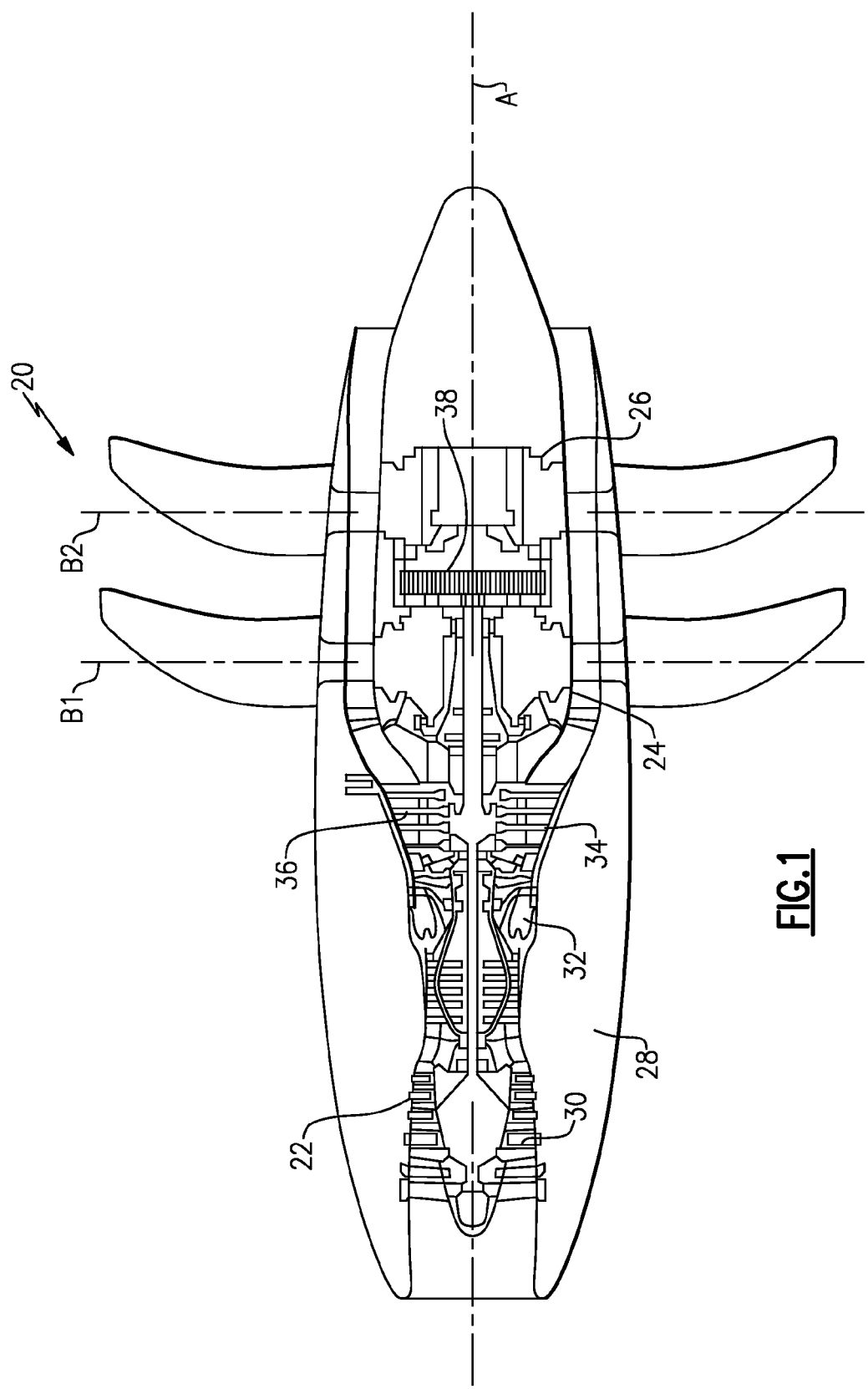
FIG. 1 is a general perspective view an exemplary gas turbine engine embodiment for use with a Counter-Rotating Open-Rotor (CROR) propfan.

FIG. 1 schematically illustrates a Counter-Rotating Open-Rotor (CROR) 20. The CROR 20 generally includes a gas turbine engine 22 with counter-rotating un-ducted rotors 24, 26 outside of a nacelle structure 28 on a central longitudinal engine axis A. The CROR 20 may be configured as a tractor (rotors ahead of the engine in a pulling configuration), or as a pusher (shown). Although depicted as a particular architecture in the disclosed non-limiting embodiment, it should be understood that the concepts described herein are applicable to other architectures.

The gas turbine engine 22 generally incorporates a compressor section 30, a combustor section 32 and a turbine section 34 with a power turbine 36. The power turbine 36 provides a speed and torque output to drive a gear system 38 which drives the counter-rotating un-ducted rotors 24, 26. The sections are defined along the central longitudinal engine axis A and the gear system 38 may be located axially between the counter-rotating un-ducted rotors 24, 26.

Figure 2:
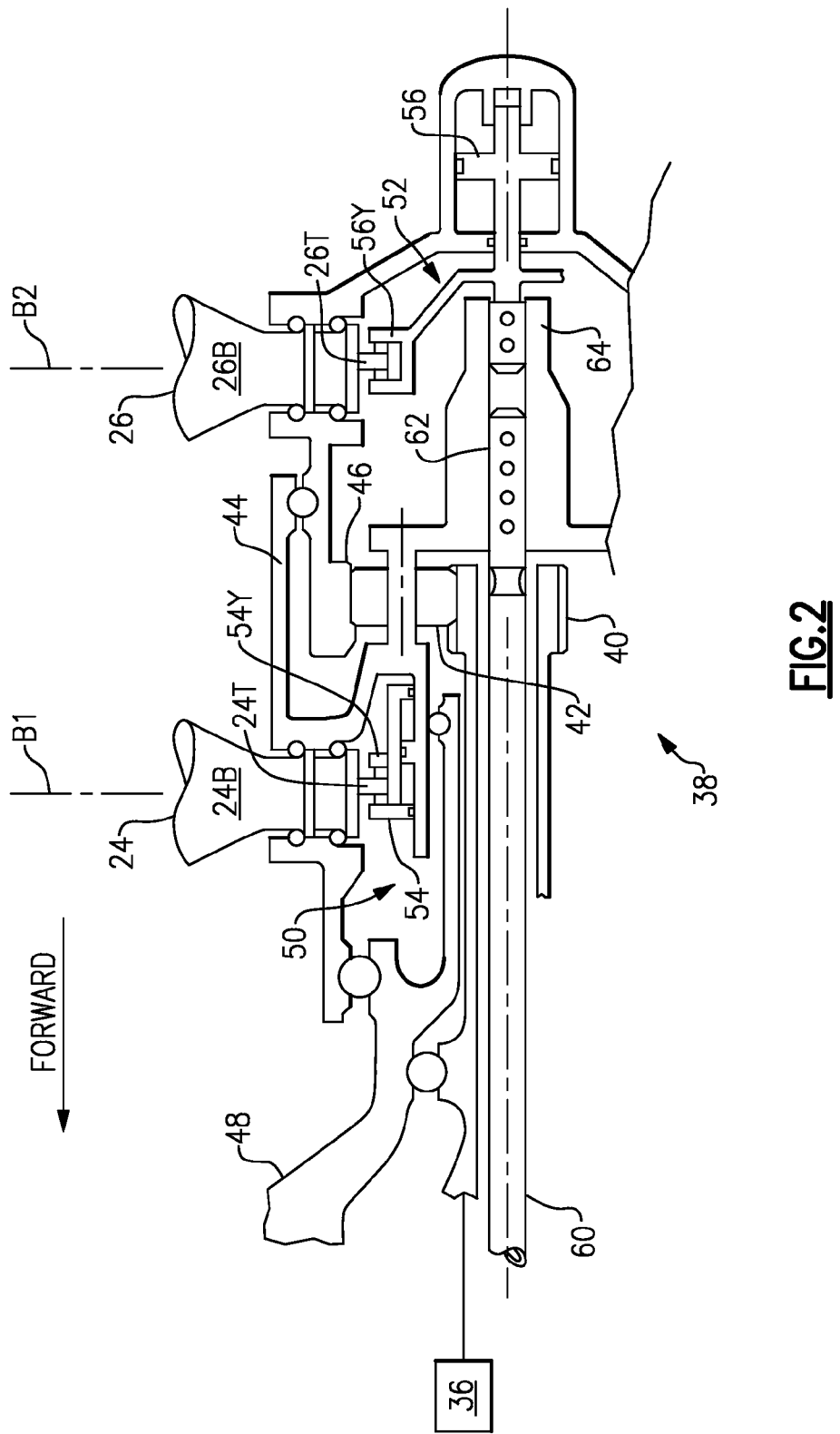
FIG. 2 is an expanded view of the CROR propfan.

With reference to FIG. 2, the gear system 38 in the disclosed non-limiting embodiment is a planetary, differential gearbox which generally includes a sun gear 40 driven by the power turbine 36, a multiple of planet gears 42, a planet carrier 44, and a ring gear 46 which rotate relative to a fixed structure 48. The forward rotor 24 rotates with the planet carrier 44 and the aft rotor 26 counter rotates with the ring gear 46.

The counter-rotating un-ducted rotors 24, 26 each includes a multiple of propeller blades 24B, 26B (one shown) which are connected with the respective planet carrier 44 and ring gear 46 through a pitch change system 50, 52. The pitch change systems 50, 52 include an axially movable forward pitch change actuator 54 and axially movable aft pitch change actuator 56 to pitch the rotor blades 24B, 26B about a respective rotor blade axis B1, B2 to achieve the desired propeller mode such as Feather, Forward Speed Governing, CP (coefficient of power) Bucket "keep out zone", and Reverse (FIG. 3).

Figure 4:
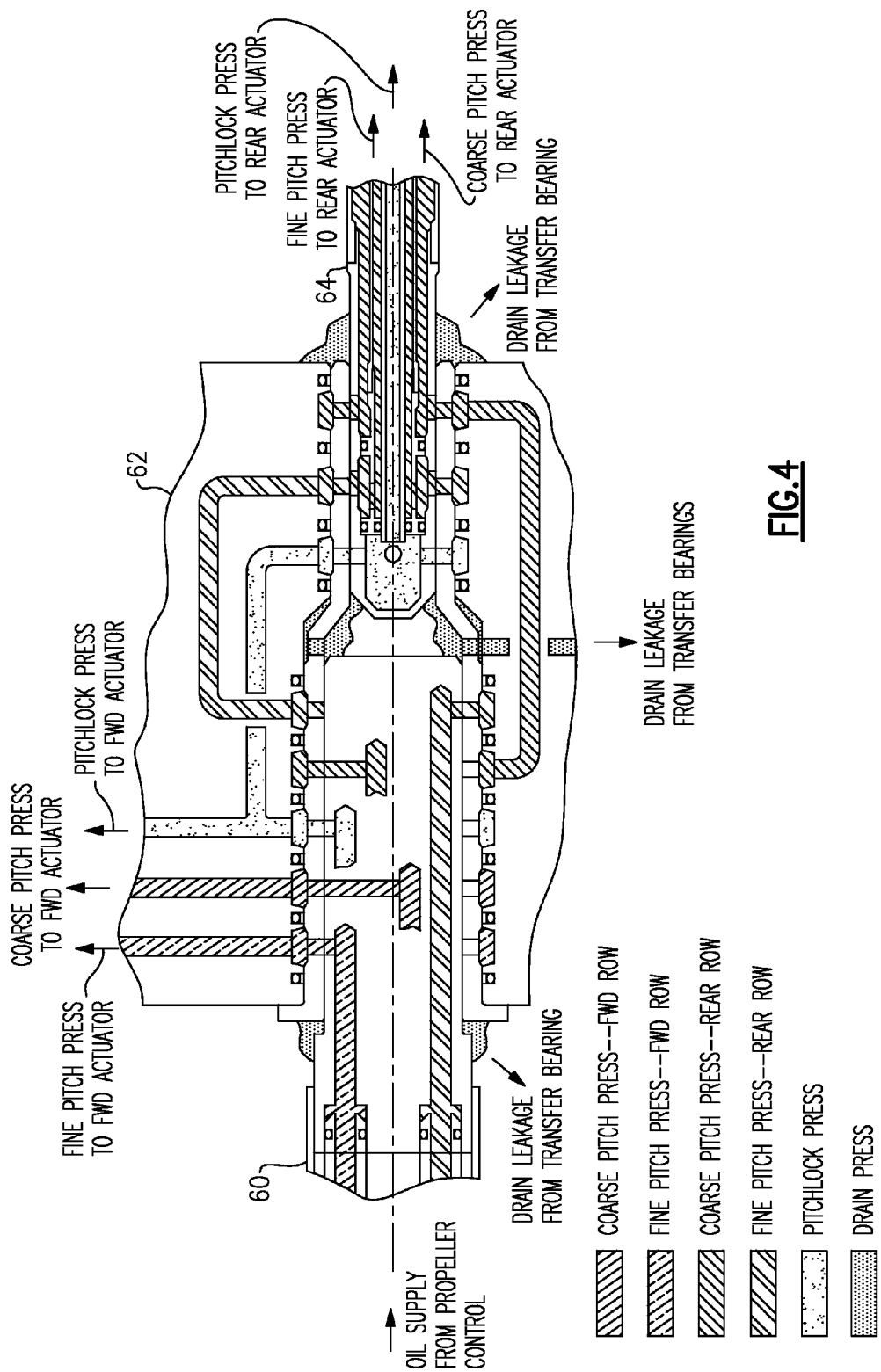
FIG. 4 is an expanded schematic view of a transfer bearing for the CROR propfan.

The pitch change systems 50, 52 may include linear hydraulic actuation systems with metered pressures that may be ducted to an oil transfer tube 60 which contains at least four separate hydraulic passages (FIG. 4). Oil supplied through the oil transfer tube 60 to the pitch change actuators 54, 56 may flow through a four-land transfer bearing 62 located at the aft end of the oil transfer tube 60. The transfer bearing 62 provides the hydraulic connection between the stationary and rotating hardware. Two pressures (coarse and fine pitch—forward rotor) from the oil transfer tube 60 are provided to the forward pitch change actuator 54, while the other two pressures (coarse and fine pitch—aft rotor) are provided to the aft pitch change actuator 56 through an aft transfer bearing 64.

Each of the pitch change actuators 54, 56 includes a dual-acting piston with differential areas sized in accordance with pitch change actuator structural and performance requirements. Each pitch change actuator 54, 56 includes a pitch change yoke 54Y, 56Y which transmits the linear force output of the pitch change actuator 54, 56 to a trunnion 24T, 26T at the base of each rotor blade 24B, 26B.

Figure 3:
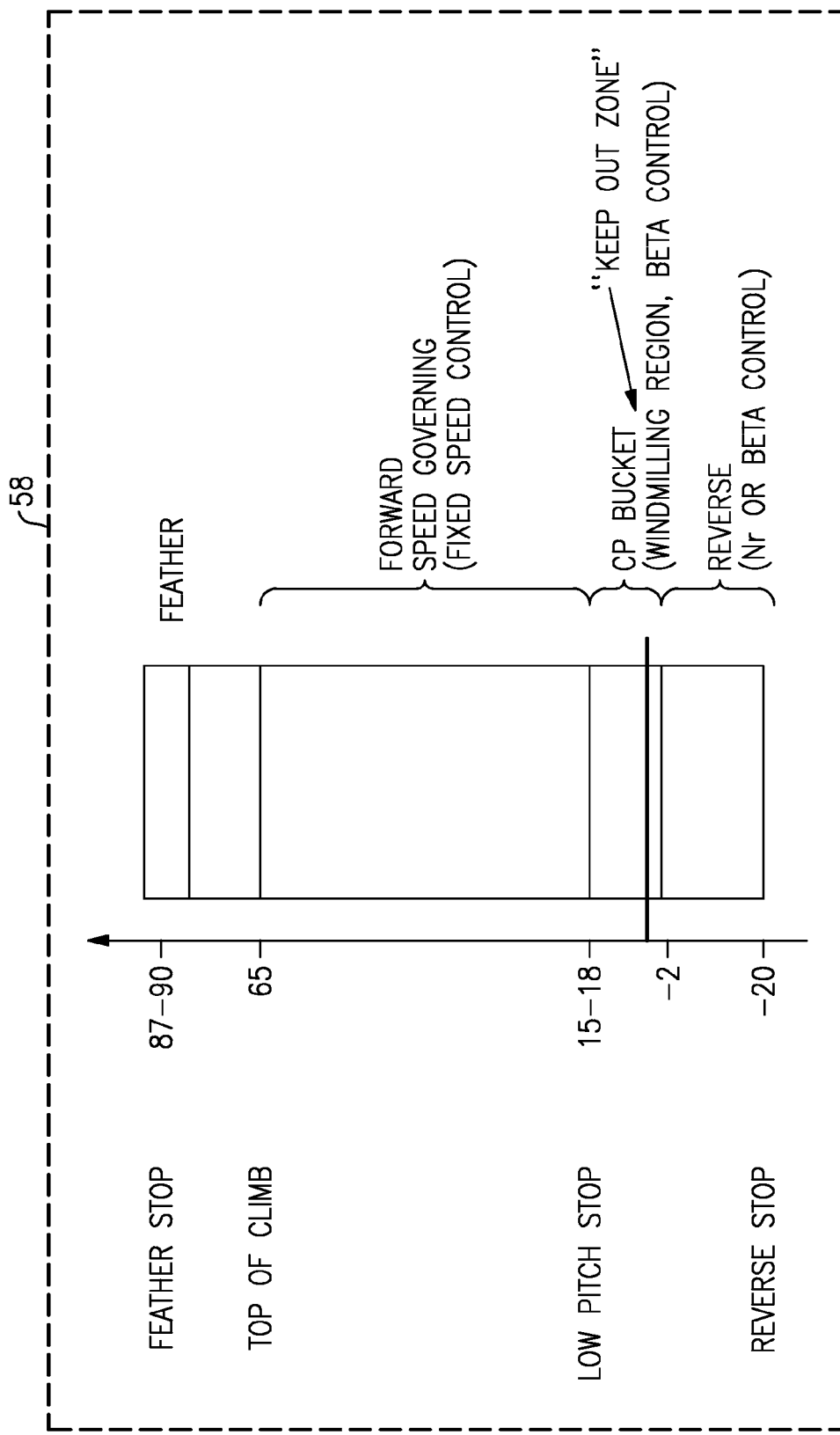
FIG. 3 is a schematic representation of a rotor control position schedule.

With reference to FIG. 3, a rotor control module 58 provides metering and control of oil supplied to the pitch change system 50, 52 to change the pitch of the rotors 24, 26 of the CROR 20. It should be understood that FIG. 3 is a block diagram representation of functions that may be enacted in either dedicated hardware circuitry or programmed software routines capable of execution in a microprocessor based electronic control environment such as rotor control module 58. The rotor control module 58 uses two primary propeller control modes for a constant speed propeller system: Fixed Speed Control and Beta Control. In flight at high power, the CROR 20 is in fixed speed control mode which, in technical parlance, operates as an isochronous governor. That is, the rotors 24, 26 are essentially the governor for the gas turbine engine power turbine 36. So the rotor control module 58 sets a fixed speed requirement and then adjusts rotor blade angle to absorb whatever power the gas turbine engine 22 outputs that the rotor blade speed will remain fixed. Although, there may be additional selectable rotor speeds for particular flight conditions, once that speed is selected, power change is accomplished through pitch change of the rotor blades rather than speed change to assure rotor blade frequencies are maintained in predesigned regions and optimal performance is available.

As power is decreased, the effectiveness of the rotors 24, 26 as the governor for the power turbine 36 becomes less. That is, slop increases as pitch approaches the CP bucket where relatively large changes in rotor blade angle do not result in much change in power absorption. The CP bucket "keep out zone" is the region where the rotors 24, 26 cannot be effectively controlled through a change in rotor blade pitch. For example, if a rotor blade pitch lower than the low pitch stop is commanded in flight, the forward airspeed of the aircraft may windmill the rotor which increases power to the system such that the rotor may overspeed. Movement of blade angle further into the bucket in the decrease pitch direction will result in increasing overspeed until blade angle has reached the reverse region where further decreases in blade angle will begin to absorb power thus reducing propeller speed—which is counter-intuitive. Under certain conditions, this CP bucket "keep out zone" may result in reversed commands which overspeed the rotors.

The low pitch stop is the lowest blade pitch angle in the fixed speed control mode below which the rotor speed can not be effectively controlled. The low pitch stop, however, must be transited through to enter reverse pitch. The rotor control module 58 switches to the Beta Control mode where rotor blade pitch is directly commanded rather than speed. Beta Control mode is typically used after aircraft touch down and when the power is relatively low such as ground idle, ground operations, or reverse operations.

With reference to FIG. 5, one non-limiting embodiment of a control system 80 with inputs and outputs to control the counter-rotating un-ducted rotors 24, 26 of the CROR 20. Mechanical connections are depicted as the heavy lines from the gas turbine engine 22 to the gear system 38 then split to the counter-rotating un-ducted rotors 24, 26. The heavy black line function boxes between the mechanical paths represent the mathematical relationships due to the mechanical systems.

The rotor control module 58 communicates with the pitch change system 50, 52 and an engine control module 82 such as a Full Authority Digital Electronic Control (FADEC) that communicates with the gas turbine engine 22. The control modules 58, 82 execute algorithms that are disclosed in terms of functional blocks and it should be understood by those skilled in the art with the benefit of this disclosure that these functions may be enacted in either dedicated hardware circuitry or programmed software routines capable of execution in microprocessor based electronics control module embodiments of various configurations.

From the gas turbine engine 22, Npt is the speed of the power turbine 36 and T is the torque of the power turbine 36 which is essentially the power output into the gear system 38. Output from the gear system 38 is two paths because the planetary differential gearbox provides the two counter-rotating outputs for the counter-rotating un-ducted rotors 24, 26.

T1 and Nr1 are torque and speed to the forward rotor 24 and T2 and Nr2 are torque and speed to the aft rotor 26. The physics of the gear system 38 provide the following mathematical relationships:

$$Nr1 + Nr2 = C*Npt \quad (1)$$

$$T1 = K*T2 \quad (2)$$

where:
Nr1 is forward rotor speed;
Nr2 is aft rotor speed;
Npt is the power turbine speed;
T1 is forward rotor torque;
T2 is aft rotor torque;
C is a constant from the gear system; and
K is a constant from the gear system.

In isochronous speed governing fixed speed control, rotor speed is measured and is desired to be held constant. The rotor control module 58 may increase or decrease blade angle to absorb more or less power as provided by the gas turbine engine to maintain constant rotor speed. The increase or decrease signal is noted as BetaDOT for "rate of change of Beta." For stable governing in the fixed speed control mode it is desirable to measure rotor blade angle. For ground handling operations such as taxi and reverse operation, it is desirable to operate the system in the Beta control mode. Beta feedback is required for that purpose.

Due to the proximity of the forward rotor 24 to the stationary structure of the gas turbine engine 22, conventional technology may be used to provide speed (Nr1) and Beta feedback to the rotor control module 58. The aft rotor 26 is relatively remote from the stationary structure of the gas turbine engine 22 and signals from the aft rotor 26 must pass through at least two rotating interfaces as well as the gear system 38.

To control the blade pitch of the counter-rotating un-ducted rotors 24, 26, two feedback loops are communicated to the rotor control module 58. A Blade Angle feedback signal (Beta1 Feedback) and a commanded rate of change of the blade angle signal (Beta1DOT commanded) communicate with the forward rotor 24. A Blade Angle feedback signal (Beta2 Feedback) and a commanded rate of change of the blade angle signal (Beta2DOT commanded) communicate with the aft rotor 26. In control parlance, commanding a rate such as changing a rotor blade angle at 3 degrees per second in the positive direction, is a rate command and is usually given a DOT for the first derivative—so BetaDOT would be rate of change of Beta.

Rotor blade angle actual and rotor speed Nr1 may be measured directly through, for example, dual magnetic sensors attached to stationary structure adjacent to the forward rotor 24 for communication to the rotor control module 58.

The rotational speed of the aft rotor 26 is calculated (Nr2 derived) from the mathematical functions above as follows— It is common and necessary for manufactures of gas turbine engines to measure the speed of the power turbine 36 to provide back-up protection against accidental overspeeding and to provide underspeed governing during Beta Mode operation of the rotor system. This signal is normally provided to the engine control 82 for that function and therefore is available to the rotor control 58. Nr2 may then be calculated from the formula Nr2=C*Npt−Nr1. That is, in this embodiment, the aft rotor speed is derived—not measured. With Beta1, Beta1DOT, Beta2, Beta2DOT, and the rotational speed of the aft rotor 26 (Nr2) speed governing is readily achieved to control blade angle and prevent the engine 22 from over speeding and maintain power within the desired limits throughout various regimes. But this requires the Beta2 and Beta2DOT signals be communicated through a multiple of rotational interfaces between the aft rotor 26 and the rotor control module 58 which may be somewhat complicated.

In this configuration, the aft rotor 26 is fully usable for ground and reverse operation under Beta Control in the same manner of the forward rotor 24 (FIGS. 6 and 7). That is, a linear relationship is provided between Beta1 Actual and Beta1 Commanded as well as between Beta2 Actual and Beta2 Commanded. This linear relationship permits a commanded negative pitch or a commanded positive pitch and the rotors 24, 26 will go to that commanded pitch. There are thus no Beta restrictions on ground operation or reverse operation.

Figure 8:
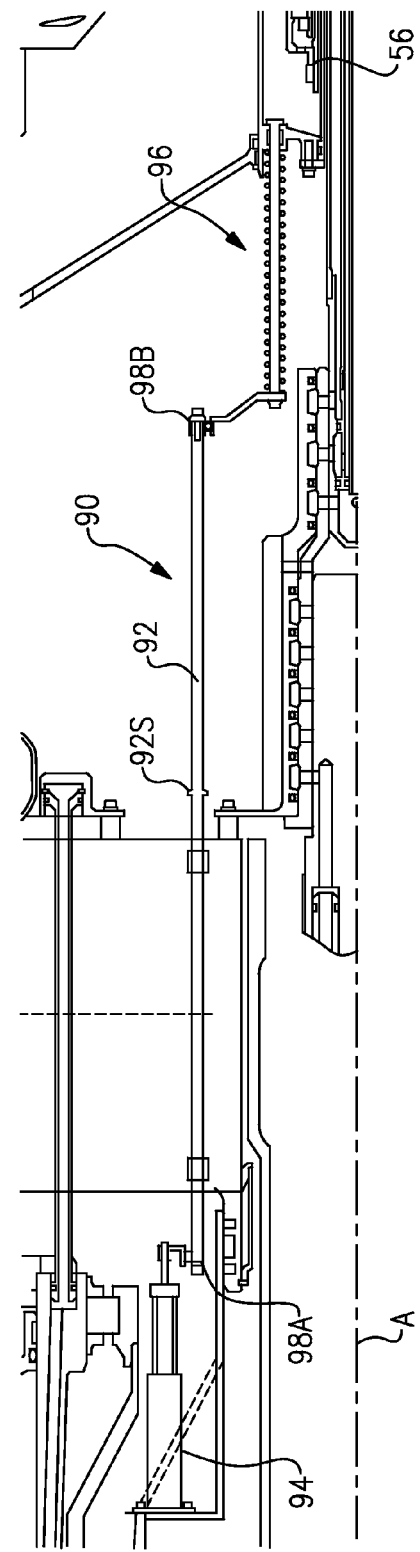
FIG. 8 is a schematic representation of a feedback system for an aft rotor of the CROR propfan of FIG. 5.

With reference to FIG. 8, to measure the Blade Angle feedback signal (Beta2 Feedback) from the aft rotor 26, a feedback assembly 90 is connected to the aft pitch change actuator 56. The feedback assembly 90 generally includes a feedback shaft 92, a LVDT 94, a sliding joint 96 and bearings 98A, 98B. The feedback shaft 92 is held rotationally stationary upon bearings 98A, 98B to provide a rotationally stationary path from the aft pitch change actuator 56 to the LVDT 94. Bearings 98A permits rotation between the feedback shaft 92 and the forward rotor 24 while bearing 98B permits rotation between the feedback shaft 92 and the aft rotor 26.

The feedback assembly 90 directly monitors axial position of the aft pitch change actuator 56. Such feedback may be required only below Flight Idle. The feedback shaft 92 includes an axial stop 92S such that the feedback shaft 92 is axially restrained above Flight Idle. Further axial movement of the aft pitch change actuator 56 above flight idle is absorbed by the sliding joint 96 such as a spring which compresses above flight idle to minimize the stroke applied to the LVDT 94. The stroke limitation increases the fidelity of measurement required of the LVDT 94. It should be understood that various other measurement systems may alternatively or additionally be provided.

With Reference to FIG. 9, another non-limiting embodiment of a control system 100 with inputs and outputs to control the counter-rotating un-ducted rotors 24, 26 of the CROR 20. In this non-limiting embodiment, the rotational speed of the aft rotor 26 is calculated (Nr2 derived) from the mathematical functions as discussed above and the Beta2 feedback signal is eliminated.

To command the aft rotor 26 for either increase pitch or decrease pitch, enough information is available because of the mathematical relationships of the gear system 38. That is, the power turbine output speed Npt is measured and the rotor speed Nr1 of the forward rotor is measured, then with the mathematical relationships, the rotor speed Nr2 of the aft rotor 26 is calculated. Control of rotor speed in the speed governing mode is accomplished in the same manner as described above for system FIG. 5 with the exception that the dynamic gains used for determining Beta2 Dot must be designed to be compatible with the least stable operating condition.

Since the control system 100 does not receive the Beta2 feedback signal, the aft rotor 26 is prevented from entering Reverse pitch by the introduction of a stroke limit or hard stop in the actuation linkage. That is, since Beta Control for the aft rotor 26 is eliminated, the aft rotor 26 is prevented from entering a pitch below the low pitch stop (FIG. 3). Beta Control operations (below the low pitch stop) such as reversing, and other such ground operations are performed by the forward rotor 24 alone as the aft rotor 26 is held fixed at the low pitch stop whenever the forward rotor 24 is commanded to a lower pitch than the low pitch stop.

Any time the control system 100 is in beta control mode, the aft rotor 26 is on the low pitch stop and the forward rotor 24 will alone move into the low blade angles and into reverse. In this configuration, the aft rotor 26 is not used for ground and reverse operation under Beta Control as is the forward rotor 24 (FIGS. 10 and 11). That is, a linear relationship is provided between Beta1 Actual and Beta1 commanded whereas the linear relationship between Beta2 Actual and Beta2 Commanded is cut off at the low pitch stop.

In one non-limiting embodiment, the aft rotor 26 is physically limited to the low pitch stop by physically limiting the stroke of the aft pitch change actuator 56. That is, during ground operation the aft rotor 26 may be positioned against the low pitch stop (often referred to as the Flight Idle Stop) and forward and reverse thrust is controlled by a combination of engine power and beta control of the forward rotor 24.

As an alternate control approach, the aft rotor 26 may be positioned against a feather hard stop (FIG. 3) since use of the mechanical low pitch stop on the aft rotor 26 requires ground thrust control based solely on blade pitch changes of the forward rotor 24. With the aft rotor 26 at a flight idle blade angle, a relatively greater amount of reverse thrust is required from the forward rotor 24 due to the forward thrust generated by the aft rotor 26 when reverse power is applied as the aft rotor 26 is limited to the low pitch stop. To maximize net reverse thrust, the aft rotor 26 may alternatively be commanded to the blade angle (feathered) to minimize the forward thrust from the aft rotor 26. This may be particularly advantageous for reverse thrust application after touchdown to minimize aircraft stopping distance.

While minimizing the forward thrust generated by the aft rotor 26 is advantageous from an aircraft stopping performance perspective after touchdown, minimization of the rotational speed variation as well as minimization of the average rotation speed of the aft rotor 26 in reverse thrust operation may also be advantageous. Minimizing the zones of potential speed operation in the aft rotor 26 may be critical to ensuring that the aft rotor is not operated continuously at a speed that may excite any rotor blade natural frequencies. This avoidance will minimize the potential for fatigue damage accumulation in the rotor assemblies.

Figure 12:
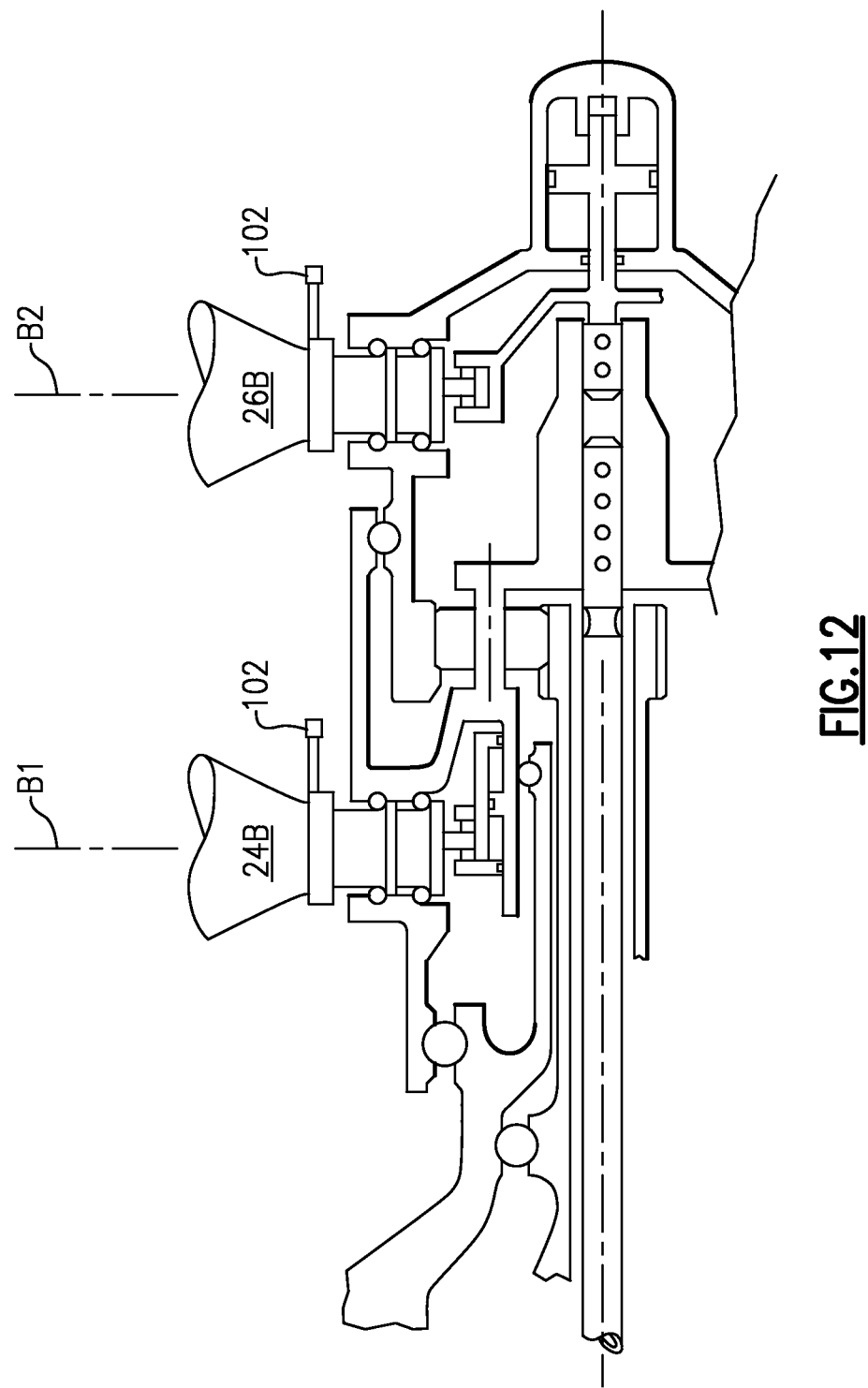
FIG. 12 is a schematic representation of a counterweight system of the CROR propfan of FIG. 9.

In the unlikely event of a loss of propulsion system hydraulic pressure, counterweights 102 (FIG. 12) are mounted to the base of each of the rotor blades 24B, 26B to provide the force output necessary to drive the rotor blades 24B, 26B towards increased pitch so as to provide a safe failure mode through elimination of any potential engine overspeed condition.

An independent electronic overspeed and low pitch stop protection system, such as that disclosed in U.S. Pat. No.

6,422,816 B1, entitled "VARIABLE PITCH PROPELLER CONTROL SYSTEM," which is assigned to the assignee of the instant disclosure and which is hereby incorporated herein in its entirety, provides protection in the event of control system failure which may otherwise result in an increase in rotor RPM outside of established limits or a commanded blade angle below established limits. In the event of a complete loss of electrical power to the rotor control system, the rotors 24, 26 are driven hydraulically towards high pitch (feather) to avoid overspeeds as well as in-flight low pitch stop violations. This may be accomplished by the application of an electrical null bias in the electro-hydraulic servo-valve such that with no electrical input to the valve, the porting is such that the actuators 54, 56 are always hydraulically driven in the increase pitch direction.

Another non-limiting embodiment limits movement of the aft rotor 26 to the low pitch stop through a pitchlock such as that disclosed in United States Patent Application No. 2007/0212220A1, entitled "CONTROLLED PROPELLER PITCH LOCK ACTUATION SYSTEM," which is assigned to the assignee of the instant disclosure and which is hereby incorporated herein in its entirety. In this non-limiting embodiment multiple pitchlocks may be symmetrically around the forward and aft rotor actuators which lock-up and prevent unwanted travel in the decrease pitch direction upon loss of hydraulic power. This permits reduction or elimination of the counterweights thus resulting in reduced system weight.

With reference to FIG. 13, another non-limiting embodiment of a control system 110 with inputs and outputs to control the counter-rotating un-ducted rotors 24, 26 of the CROR 20 is schematically illustrated. In this non-limiting embodiment, pitch change systems 50, 52 are mechanically linked such as through a ball screw. The blade angle of the forward rotor 24 (Beta1) is commanded and the blade angle of the aft rotor 26 (Beta2) follows such that there is a mechanical functional relationship B2=f(B1). The relationship is predetermined as described in United States Patent Application No. 2010/0310369 A1 entitled "PITCH CHANGE ACTUATION SYSTEM FOR A COUNTER-ROTATING PROPELLER," which is assigned to the assignee of the instant disclosure and which is hereby incorporated herein in its entirety. This configuration eliminates the need for Nr2 and Beta2 feedback signals as well as the command signal Beta2DOT from the aft rotor 26. This minimizes complexity.

In this configuration, the aft rotor 26 is used for ground and reverse operation under Beta Control (FIGS. 14 and 15). Although a linear relationship is provided between Beta1 Actual and Beta1 commanded, a non-linear relationship between Beta2 Actual and Beta1 Commanded results from the control of the aft rotor 26 through the forward rotor 24.

The non-linear relationship between Beta2 Actual and Beta2 Commanded may be through a scheduling function provided, for example, mechanically with a cam or other mechanical linkage such that the power absorption of the rotors 24, 26 are commanded with one signal. So Beta1 is commanded such that Beta1 actual is linear while Beta2 is a nonlinear function.

Although the aft rotor 26 may be somewhat less accurately controlled than the forward rotor 24, the acoustics of the CROR 20 may actually be improved as noise generation is reduced because the speeds of the rotors 24, 26 are slightly different. As the rotors 24, 26 are in series in the airflow, the power absorption of each rotor is different such that when operated in unison the function advantageously reduces noise generation. In other words, one rotor 24, 26 will be running at the commanded speed while the other rotor 26, 24 will be somewhere close but different such that end result is a relatively quieter CROR 20.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of controlling a Counter-Rotating Open-Rotor (CROR) comprising:
   measuring a speed of a first rotor to obtain a measured first rotor speed;
   measuring a power turbine output speed to obtain a measured power turbine speed;
   indirectly deriving a speed of a second rotor as a function of the measured first rotor speed and the measured power turbine speed to obtain a derived second rotor speed; and
   controlling a pitch of the first rotor and a pitch of the second rotor in response to the measured first rotor speed and the derived second rotor speed.

2. The method as recited in claim 1, wherein the first rotor is a forward rotor and the second rotor is an aft rotor along a common axis of rotation.

3. The method as recited in claim 1, wherein a gear system which drives the first rotor and the second rotor axially is located between the first rotor and the second rotor.

4. The method as recited in claim 1, wherein deriving the speed of the second rotor occurs in all control modes.

5. The method as recited in claim 1, further comprising preventing the second rotor from entering a coefficient of power (CP) bucket.

6. The method as recited in claim 1, further comprising restricting the second rotor to a low pitch stop.

7. The method as recited in claim 1, further comprising mechanically holding the second rotor at a low pitch stop.

8. The method as recited in claim 1, further comprising at least one pitch lock which prevents travel in a low pitch direction below a predetermined point.

9. The method as recited in claim 1, further comprising holding the second rotor at a feather stop when the first rotor is in Reverse.

10. A Counter-Rotating Open-Rotor (CROR) comprising:
    a first rotor;
    a second rotor;
    a power turbine; and
    a rotor control configured to receive a measured speed of the first rotor, receive a measured speed of the power turbine, derive a speed of the second rotor as a function of the first rotor measured speed and the power turbine measured speed, and command a pitch angle of the second rotor in response to the derived speed of the second rotor.

11. The CROR as recited in claim 10 wherein the first rotor is a forward rotor and the second rotor is an aft rotor along a common axis of rotation.

12. The CROR as recited in claim 10 further comprising a gear system which drives said first rotor and said second rotor, said gear system axially between said first rotor and said second rotor.

13. The CROR as recited in claim 10 wherein said rotor control module receives a Blade Angle feedback (Beta2 Feedback) of said second rotor.

14. The CROR as recited in claim 10 wherein said second rotor is prevented from entering a coefficient of power (CP) bucket.

15. The CROR as recited in claim 10 wherein a pitch of said second rotor is restricted to a Low Pitch Stop.

16. The method as recited in claim 1, wherein the indirect deriving of the includes deriving without directly measuring the pitch angle of the second rotor.

17. The method as recited in claim 1, wherein the derived second rotor speed is equal to the measured speed of the power turbine multiplied by a gear constant of a gear system configured to drive the first and second rotor and the measured speed of the first rotor subtracted therefrom.

18. The CROR as recited in claim 10, wherein the rotor control module is configured to derive the speed of the second rotor and to command the pitch angle of the second rotor without receiving a second rotor pitch angle feedback.

19. The CROC as recited in claim 10, further comprising a gear system configured to drive the first rotor and the second rotor, wherein the derived speed of the second rotor is equal to the measured speed of the power turbine multiplied by a gear constant of the gear system and the measured speed of the first rotor subtracted therefrom.

20. The CROC as recited in claim 19, wherein the gear system is located axially between the first and second rotor.

21. A method of controlling a Counter-Rotating Open-Rotor (CROR) comprising:
   indirectly deriving a speed of a second rotor as a function of a first rotor speed of a first rotor and a power turbine speed of a power turbine to obtain a derived second rotor speed; and
   controlling a pitch of the first rotor and a pitch of the second rotor in response to the first rotor speed and the derived second rotor speed.

\* \* \* \* \*